United States Patent
Argoeti et al.

(10) Patent No.: US 11,310,257 B2
(45) Date of Patent: Apr. 19, 2022

(54) ANOMALY SCORING USING COLLABORATIVE FILTERING

(71) Applicant: Microsoft Technology Licensing, LLC, Redmond, WA (US)

(72) Inventors: Itay Argoeti, Petch Tikva (IL); Roy Levin, Haifa (IL); Jonathan Moshe Monsonego, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 599 days.

(21) Appl. No.: 16/287,592

(22) Filed: Feb. 27, 2019

(65) Prior Publication Data

US 2020/0274894 A1    Aug. 27, 2020

(51) Int. Cl.
*H04L 29/06* (2006.01)
*G06N 20/00* (2019.01)
*G06F 7/556* (2006.01)

(52) U.S. Cl.
CPC .......... *H04L 63/1433* (2013.01); *G06F 7/556* (2013.01); *G06N 20/00* (2019.01)

(58) Field of Classification Search
CPC ...... H04L 63/1433; G06N 20/00; G06F 7/556
See application file for complete search history.

(56) References Cited

U.S. PATENT DOCUMENTS

| | | |
|---|---|---|
| 9,727,723 B1 | 8/2017 | Kondaveeti et al. |
| 2006/0048106 A1 | 3/2006 | Citron et al. |
| 2008/0141233 A1 | 6/2008 | Gurevich et al. |
| 2008/0313496 A1 | 12/2008 | Prabhakaran et al. |
| 2009/0055813 A1 | 2/2009 | Haber et al. |
| 2014/0150066 A1 | 5/2014 | Chandolu et al. |
| 2015/0261649 A1 | 9/2015 | Boehm et al. |
| 2015/0263999 A1 | 9/2015 | Levin et al. |

(Continued)

FOREIGN PATENT DOCUMENTS

WO    2015184425 A1    12/2015

OTHER PUBLICATIONS

"International Search Report and Written Opinion Issued in PCT Application No. PCT/US2020/064749", dated Mar. 22, 2021, 12 Pages.

(Continued)

*Primary Examiner* — Tadesse Hailu
*Assistant Examiner* — Darrin Hope
(74) *Attorney, Agent, or Firm* — Ogilvie Law Firm

(57) ABSTRACT

A machine learning model is trained using tuples that identify an actor, a resource, and a rating based on a normalized count of the actor's attempts to access the resource. Actors may be users, groups, IP addresses, or otherwise defined. Resources may be storage, virtual machines, APIs, or otherwise defined. A risk assessor code feeds an actor-resource pair to the trained model, which computes a recommendation score using collaborative filtering. The risk assessor inverts the recommendation score to obtain a risk measurement; a low recommendation score corresponds to a high risk, and vice versa. The risk assessor code or other code takes cybersecurity action based on the recommendation score. Code may accept a risk R, or aid mitigation of the risk R, where R denotes a risk that the scored pair represents an unauthorized attempt by the pair actor to access the pair resource.

20 Claims, 7 Drawing Sheets

(56) References Cited

U.S. PATENT DOCUMENTS

| | | | |
|---|---|---|---|
| 2016/0063071 | A1 | 3/2016 | Guy et al. |
| 2016/0188711 | A1 | 6/2016 | Levin et al. |
| 2016/0217392 | A1 | 7/2016 | Hashavit et al. |
| 2016/0248800 | A1* | 8/2016 | Ng .................... G06Q 10/0635 |
| 2017/0068746 | A1 | 3/2017 | Levin et al. |
| 2017/0103194 | A1* | 4/2017 | Wechsler ............. G06F 21/316 |
| 2017/0118240 | A1* | 4/2017 | Devi Reddy ....... H04L 63/1433 |
| 2017/0148085 | A1* | 5/2017 | Tang ................... G06Q 30/0631 |
| 2017/0220945 | A1 | 8/2017 | Barger et al. |
| 2017/0228418 | A1 | 8/2017 | Levin et al. |
| 2017/0323463 | A1 | 11/2017 | Leiba et al. |
| 2018/0152465 | A1 | 5/2018 | Levin et al. |
| 2018/0189296 | A1 | 7/2018 | Ashour et al. |
| 2018/0278633 | A1 | 9/2018 | Brutzkus et al. |
| 2018/0349599 | A1* | 12/2018 | Teller ................. H04L 63/1433 |
| 2019/0349391 | A1 | 11/2019 | Elsner et al. |
| 2020/0143240 | A1* | 5/2020 | Baker ...................... G06N 3/04 |
| 2021/0224194 | A1 | 7/2021 | Harar et al. |

OTHER PUBLICATIONS

"International Search Report and Written Opinion Issued in PCT Application No. PCT/US20/014588", dated Nov. 10, 2020, 11 Pages.

Turcotte, et al., "Poisson Factorization for Peer-Based Anomaly Detection", In Proceedings of IEEE Conference on Intelligence and Security Informatics (ISI), Sep. 28, 2016, pp. 208-210.

"Big data", Retrieved from: https://en.wikipedia.org/wiki/Big_data, Jan. 5, 2020, 16 Pages.

"Cache (computing)", Retrieved from: https://en.wikipedia.org/wiki/Cache_(computing), Dec. 25, 2019, 08 Pages.

"Collaborative Filtering", Retrieved From: https://en.wikipedia.org/wiki/Collaborative_filtering, Retrieved Date: Sep. 22, 2020, 12 Pages.

"Collaborative Filtering", Retrieved From: https://spark.apache.org/docs/2.2.0/ml-collaborative-filtering.html, Retrieved Date: Sep. 22, 2020, 3 Pages.

"Evaluation Measures (Information Retrieval)", Retrieved From: https://en.wikipedia.org/wiki/Evaluation_measures_(information_retrieval)#Mean_average_precision, Retrieved Date: Sep. 22, 2020, 10 Pages.

"Locality of Reference", Retrieved from: https://en.wikipedia.org/wiki/Locality_of_reference, Dec. 7, 2019, 06 Pages.

"Why splitting the data into the training and testing set is not enough", retrieved from <<https://stats.stackexchange.com/questions/168807/why-splitting-the-data-into-the-training-and-testing-set-is-not-enough>>, Aug. 26, 2015, 15 pages.

"Anomaly detection", retrieved from <<https://en.wikipedia.org/wiki/Anomaly_detection>>, Feb. 18, 2019, 6 pages.

"User behavior analytics", retrieved from <<https://en.wikipedia.org/wiki/User_behavior_analytics>>, Oct. 26, 2018, 3 pages.

"Splunk® User Behavior Analytics", retrieved from <<https://www.splunk.com/pdfs/fact-sheets/splunk-user-behavior-analytics.pdf>>, 2015, 3 pages.

"Securonix User and Entity Behavior Analytics", retrieved from <<https://www.securonix.com/products/ueba/>>, no later than Feb. 9, 2019, 6 pages.

"Exabeam Advanced Analytics", retrieved from <<https://www.exabeam.com/product/exabeam-advanced-analytics/>>, no later than Feb. 9, 2019, 4 pages.

"User Behavior Analytics (UBA)", retrieved from <<https://www.rapid7.com/fundamentals/user-behavior-analytics/>>, no later than Feb. 9, 2019, 6 pages.

"Intelligent Security Operations", retrieved from <<https://www.mcafee.com/enterprise/en-us/solutions/intelligent-security-operations.html>>, no later than Feb. 9, 2019, 9 pages.

"Symantec Information Centric Analytics", retrieved from <<https://www.symantec.com/content/dam/symantec/docs/data-sheets/information-centric-analytics-en.pdf>>, 2018, 2 pages.

"CBA: RSA Cloud Behavioral Analytics", retrieved from <<https://community.rsa.com/docs/DOC-86678>>, Sep. 11, 2018, 3 pages.

Jesús Bobadilla, et al., "Recommender Systems Clustering Using Bayesian Non Negative Matrix Factorization", retrieved from <<https://ieeexplore.ieee.org/stamp/stamp.jsp?arnumber=8241787>>, Nov. 10, 2017, 16 pages.

Benjamin Marlin, "Collaborative Filtering: A Machine Learning Perspective", retrieved from <<https://people.cs.umass.edu/~marlin/research/thesis/cfmlp.pdf>>, 2004, 137 pages.

"Apache Spark", retrieved from <<https://en.wikipedia.org/wiki/Apache_Spark>>, Feb. 18, 2019, 9 pages.

George Seif, "The 5 Clustering Algorithms Data Scientists Need to Know", retrieved from <<https://towardsdatascience.com/the-5-clustering-algorithms-data-scientists-need-to-know-a36d136ef68>>, Feb. 5, 2018, 9 pages.

"Microsoft Cloud App Security overview", retrieved from <<https://docs.microsoft.com/en-us/cloud-app-security/what-is-cloud-app-security>>, Jan. 26, 2019, 5 pages.

"What is Azure Advanced Threat Protection?", retrieved from <<https://docs.microsoft.com/en-us/azure-advanced-threat-protection/what-is-atp>>, Jan. 2, 2019, 5 pages.

Kenneth Wai-Ting Leung, et al., "CLR: A Collaborative Location Recommendation Framework based on Co-Clustering", retrieved from <<http://www.cse.ust.hk/~dlee/Papers/sigir-11-clr-loc-recommend.pdf>>, 2011, 10 pages.

"Non Final Office Action Issued in U.S. Appl. No. 16/746,894", dated Jan. 21, 2022, 18 Pages.

* cited by examiner

ANOMALY SCORING USING COLLABORATIVE FILTERING

BACKGROUND

Cybersecurity tries to reduce or prevent attacks that damage desirable qualities of data and computing resources, such as confidentiality, availability, and integrity. Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

In particular, installing tools and techniques for detecting unusual behavior is one of the many possibilities to consider when implementing defense in depth. Tools and techniques have been developed for user behavior analytics (UBA) and for user and entity behavior analytics (UEBA), which may detect financial fraud, insider threats, targeted attacks from external sources, and other malicious behaviors in the context of routine and authorized behaviors. UBA and UEBA look at patterns of behavior by humans or by automated entities or both, and then apply algorithms (which may in turn apply statistical analysis) to detect significant departures from established patterns of behavior. Those departures, which may also be referred to as "anomalies", are then investigated as potential threats.

SUMMARY

Some embodiments described herein include a machine learning model which has been trained using a collection of training-tuples. Each training-tuple includes a training-tuple actor-id identifying a training-tuple actor, a training-tuple resource-id identifying a training-tuple resource in a guarded computing system (GCS), and at least one rating that is based on how many times the training-tuple actor attempted to access the training-tuple resource. A risk assessor code feeds a pair to the machine learning model. The pair includes a pair actor-id identifying a pair actor and a pair resource-id identifying a pair resource in the GCS. The pair need not include a rating. A recommendation score is computed in the model by collaborative filtering based on training derived from training-tuples. The risk assessor code, or other code, takes one or more cybersecurity actions based on the recommendation score. Such actions may include a risk acceptance action which accepts a risk R, or a risk mitigation action which aids mitigation of the risk R, where R denotes a risk that the pair represents an unauthorized attempt by the pair actor to access the pair resource. The recommendation score has an inverse relationship to the risk R, in that a low recommendation score corresponds to a high risk, and vice versa.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
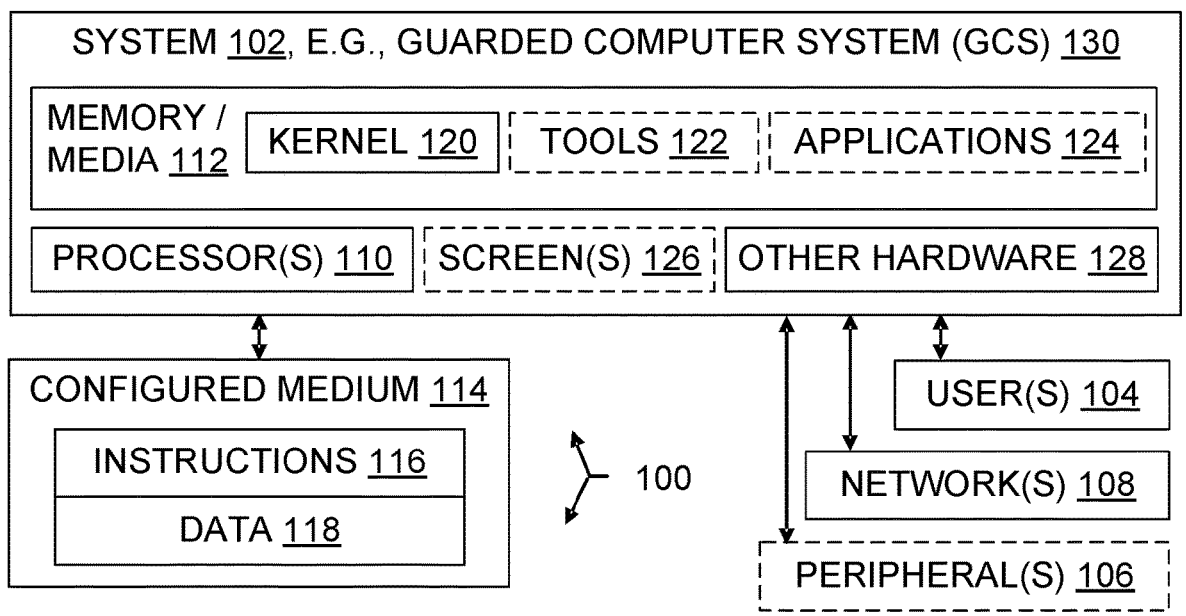
FIG. 1 is a block diagram illustrating a computer system and also illustrating a configured storage medium.

Some cyberattacks can be detected as unauthorized operations done to an item in storage, and in particular, as unauthorized attempts to access an item in a cloud storage context. Unauthorized storage access may have a goal such as data exfiltration, or changing source code to add malware or a backdoor when the code is stored in cloud storage, or aiding ransomware by encrypting stored data, or exploiting a cloud storage customer's storage account to gain free storage space for the attacker. One way to gain access to someone else's storage account is by using social engineering techniques like phishing or by using a storage key that has unintentionally been leaked by an account owner. Hence, one challenge of storage security is to recognize suspicious activity in an account even when the activity is apparently being done by a legitimate user of the account.

Another challenge is detecting cyberattacks against cloud storage accounts which are relatively new. Some familiar solutions look for specific attack types such as ransomware attacks, but do not detect other kinds of attacks such as malware insertion, backdoor insertion, or unauthorized storage of data. Detection tools tailored to detect a specific type of attack often involve either using a set of rules that are too rigid for easy application in varied circumstances or using a supervised machine learning model which requires labels that are very difficult and tedious to obtain. Other familiar solutions employ generic anomaly detection techniques which try to find behavior that is out-of-the-ordinary for a machine, presuming that such behavior may indicate a security risk. But this approach often relies on the history of a specific machine, which may not be rich and not be representative enough to generalize from. Hence, such a detection tool can yield too many false alarms to be efficient in practice.

In response to such challenges, some embodiments described here use an adaptation of collaborative filtering to help detect unauthorized accesses to resources generally and to storage resources in particular, whether it be cloud storage or more localized storage such as hybrid storage or entirely on-premises storage.

Collaborative filtering has familiar uses in recommendation systems, such as those which recommend, to a particular consumer, a movie to watch or a product to buy. The recommendation is based on the actions of other consumers. The recommendation system works by using existing ratings (either implicit or explicit) that have been given by users to products, in order to predict ratings of unrated products. Collaborative filtering in the familiar context of a commerce site assumes that when a particular consumer agreed with the other consumers about other movies or products, the consumer is likely to also agree with them about a particular movie or product the consumer is considering.

Some technologies described herein are directed to the technical activity of automatically detecting unauthorized attempts to access resources in a computing system, thereby reducing the risk of undetected intrusion or exfiltration. Some teachings are directed in particular to protecting storage accounts from cyberattacks by detecting anomalous access attempts through an adaptation of collaborative filtering for use in cybersecurity. Specific technical tools and techniques are described here in response to the challenge of providing defense-in-depth. Other technical activities pertinent to teachings herein will also become apparent to those of skill in the art.

Some embodiments described herein adapt collaborative filtering from its use in recommendation systems to usage instead for cyberattack intrusion detection. As part of the technical adaptations made, rather than operational data and structures representing people and products they might buy, some embodiments operate with actor IDs and resource IDs. Also, a recommendation score produced by collaborative filtering is not used by a commerce engine as a measure of whether to recommend a product for purchase, but is used instead by a cybersecurity mechanism as a measure of risk, e.g., as a decision factor in an intrusion detection system, an intrusion prevention system, or a data exfiltration avoidance system, which may include or operate within a multi-layered cybersecurity system or process.

Although teachings herein are not limited to cloud environments, cloud adoption introduces new challenges and complexities for keeping organizations secure, and computing environments continue to have security challenges even without cloud involvement. Some embodiments described herein help security personnel harvest the effectiveness of collaborative filtering for user access anomaly detection, without having any labeled data, in order to detect compromised users and insider threats. This helps address issues such as the difficulty of detecting zero-day attacks, insider threats, compromised identity, and how to prioritize events and alerts.

Many security products generate security alerts based on deterministic behavior patterns. However, such alerts fail to discover attacks that deviate from their pre-defined patterns. Other security products use deterministic detection logic or rely mainly on statistical rules to identify anomalies. Such approaches can lack effectiveness, efficiency, or both. For example, zero-day attacks or other more sophisticated and never seen attacks may remain undiscovered. A malicious user (an insider or an outsider using compromised accounts) may perform diverse operations on multiple resources that are seemingly legitimate but deviate from norm. For instance, accessing a SharePoint® site via a browser (mark of Microsoft Corporation), downloading a file from a file hosting service, and logging into a remote machine, are each legitimate actions which will evade detection or at least not cause alerts from most security products. Lastly, SecOps and other security tools and personnel are flooded with logs and false positive security alerts, and would benefit from better mechanisms to focus on what is most likely to be important.

Some embodiments use the recommendation scoring techniques that are used for products and purchase recommendations, but the techniques are adapted to the data and post-scoring action context of intrusion detection. This approach works better than some familiar intrusion detection mechanisms because the data used to calculate the anomaly score of an event is not based merely on a particular history but also on specified related histories as well. The particular embodiments presented here go well beyond a mere observation that collaborative filtering can be used to solve different problems than the problem of how to increase sales at a commerce site. The embodiments describe and expressly claim some specific adaptations which make that initial observation implementable in practical terms for intrusion detection. The adaptations are something more than a mere idea, and they merit close attention in their own right.

Nonetheless, some embodiments described herein may be viewed by some people in a broader context. For instance, concepts such as access, collaboration, filtering, intrusion, recommendations, risk, and scoring, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to detect cyber intrusions using data that is too scarce or too sparse to operate effectively as a machine learning training set for anomaly detection. Other media, systems, and methods involving access, collaboration, filtering, intrusion, recommendations, risk, or scoring are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. Some embodiments address technical activities that are rooted in computing technology and improve the functioning of computing systems by helping secure those systems. For instance, some embodiments help detect an unauthorized access even when the user performing the access has been authenticated and no file system or access control list permissions are being violated by the access. Some activities of embodiments support the detection of anomalous accesses that may be a symptom of unauthorized or abnormal use of processing hardware. Some support the identification of particular accessors or access paths as anomalous, to a specified degree which is captured in the form of a recommendation score, which is an inverse measure of risk.

Some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein implement intrusion detection or intrusion prevention steps for risk mitigation as disclosed herein. Some include machine learning models trained on particular kinds of training tuples, including ratings based on particular kinds of data and having particularly relative weighting characteristics.

Technical effects provided by some embodiments include more efficient detection of security attacks based on scarce or sparse access data, and more cost-effective security through leveraging existing code libraries for matrix factorization, singular value decomposition, or principal component analysis.

Some embodiments include technical adaptations such as actor IDs and resource IDs employed (from the perspective of a collaborative filter) in the roles of user and product, and collaborative filtering recommendation scores employed (from a security administrator or software design perspective) as inverse measures of intrusion risk.

Other advantages based on the technical characteristics of the teachings will also be apparent to one of skill from the description provided.

Acronyms and Abbreviations

Some acronyms and abbreviations are defined below. Others may be defined elsewhere herein or require no definition to be understood by one of skill.
ACL: access control list
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
IDE: integrated development environment, sometimes also called "interactive development environment"
IDS: intrusion detection system (host-based or network-based)
IP: internet protocol
IPS: intrusion prevention system (host-based or network-based)
MAC: media access control
NIC: network interface card
OS: operating system
RAM: random access memory
ROM: read only memory
TCP: transmission control protocol
UDP: user datagram protocol
URL: uniform resource locator
VM: virtual machine Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code. Code which must be interpreted or compiled in order to execute is referred to as "source code".

"Program" is used broadly herein, to include applications, kernels, drivers, interrupt handlers, firmware, state machines, libraries, and other code written by programmers (who are also referred to as developers) and/or automatically generated.

"Service" means a consumable program offering in a cloud computing environment or other network or computing system environment.

"Cloud" means pooled resources for computing, storage, and networking which are elastically available for measured on-demand service. A cloud may be private, public, community, or a hybrid, and cloud services may be offered in the form of infrastructure as a service, platform as a service, software as a service, or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device;

(h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as obtaining actor-ids and resource-ids from data logs, packet analyzers, routing caches, proxy caches, or other representations of thousands of communications (which may be sessions or packets, for example), and collaboratively filtering relevant actor-ids and resource-ids to compute recommendation scores fast enough to prevent intrusions without bringing authorized accesses to an unacceptable crawl, are understood herein as requiring and providing speed and accuracy that are not obtainable by human mental steps, in addition to their inherently digital nature (a human mind cannot interface directly with RAM or other digital storage to retrieve the necessary data). This is well understood by persons of skill in the art, but others may sometimes need to be informed or reminded of the facts. Unless stated otherwise, embodiments are presumed to be capable of operating at scale in production environments, or in testing labs for production environments, as opposed to being mere thought experiments. Unless otherwise indicated, operating "at scale" includes operating with at least twenty user accounts or with training derived from at least five hundred training-tuples, or computing at least fifty recommendation scores within two minutes of real world clock time, or a combination of the foregoing.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

An "on-premises network" is a network on the premises of a particular entity and owned by that entity, and a "cloud network" is a network accessible through the internet which is owned by a cloud service provider and which provides compute, storage, and network capabilities to multiple entities.

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accepting, accessing, alerting, allowing, assigning, collaboratively filtering, clustering, communicating, comparing, computing, decomposing, detecting, displaying, factoring, feeding, flagging, forming, identifying, implementing, logging, marking, mitigating, operating, performing, preventing, receiving, requesting, scoring, selecting, storing, submitting, taking action, terminating, testing, training, tuning, using (and accepts, accepted, accesses, accessed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment
102 computer system, also referred to as computational system or computing system
104 users
106 peripherals
108 network generally
110 processor
112 computer-readable storage medium, e.g., RAM, hard disks 114 removable configured computer-readable storage medium
116 instructions executable with processor; may be on removable media or in other memory (volatile or non-volatile or both)
118 data
120 kernel(s), e.g., operating system(s), BIOS, device drivers
122 tools, e.g., anti-virus software, firewalls, packet sniffer software, intrusion detection systems (IDS), intrusion prevention systems (IPS)
124 applications, e.g., word processors, web browsers, spreadsheets
126 display screens
128 computing hardware not otherwise associated with a reference number 106, 108, 110, 112, 114
130 guarded computing system
200 actor, i.e., an entity or group of entities that performs one or more actions in or to a computing system; an actor may be an individual user, e.g., user with username FooBarBob, or a collection of users, e.g., everyone sending packets from a specified range of network addresses or a through a specified proxy or from a specified IP address
202 actor identifier, a.k.a. "actor ID" or "actor-id"; may be implemented as a string, a hash value, a pointer, an index into a table of identifiers, a handle, a globally unique identifier (GUID), or another value that identifies an actor or an actor's account to a kernel or to cybersecurity software or both
204 attempt to access a resource; unless clearly indicated otherwise by context or definition, includes both failed attempts and successful attempts; may be, e.g., in the form of a packet, a procedure call, a method invocation, an interrupt, a signal, or another form
206 resource in a computing system
208 resource identifier, a.k.a. "resource ID" or "resource-id"; may be implemented as a string, a hash value, a pointer, an index into a table of identifiers, a handle, a globally unique identifier (GUID), or another value that identifies a resource to a kernel or to cybersecurity software or both
302 source IP address
304 source port number, e.g., in a TCP segment or UDP datagram
306 username
308 user agent ID
310 user group ID, e.g., workgroup ID
312 user role ID, e.g., role in a role-based access control environment
314 user account ID, e.g., account number
316 device identifier, e.g., IP address or MAC address or URL identifying a device 102 or an interface of a device 102
318 service identifier
320 process identifier
402 user group, e.g., workgroup
404 IP address
406 IP address range
408 role
410 port
412 account
414 software agent
416 service
418 process, e.g., what is listed by commands such as ps, htop (in Linux® environments) or the TaskManager utility (in Microsoft Windows® environments) (marks of Linus Torvalds, Microsoft Corporation, respectively)
502 storage item; may be a cloud-based storage item such as storage accessed through a cloud API, or a non-cloud-based storage item such as a storage item local to a machine or accessed only through a local area network
504 virtual machines generally
506 application program interface; not limited to applications per se
600 training-tuple; also referred to as "training tuple"
602 actor-id located in a training-tuple; this is an example of actor-ids 202 generally
604 resource-id located in a training-tuple; this is an example of resource-ids 208 generally
606 rating
608 number of access attempts in a specified context, e.g., by a particular actor attempting to access a particular resource during a particular time period
610 time period
700 cloud, e.g., private cloud, public cloud, hybrid cloud, community cloud; a storage environment which provides scalability, elasticity, resource pooling, and a measured storage service
702 cloud infrastructure, e.g., APIs for allocating, deploying, or accessing cloud storage or other cloud resources such as computing or network resources; may include hypervisors or other kernels
704 cloud-based storage item
706 file
708 object (in the object-oriented programming sense)
710 block (of storage)
712 blob (binary large object)
714 log
716 container
718 table, especially in a relational or other database
720 queue
722 database
724 network interface
800 system configured with collaborative filtering adaptation for cybersecurity
802 machine learning model; assumed to be trained unless stated otherwise (which occurs, e.g., in FIG. 12's recital of a "model being trained")
804 risk, e.g., a likelihood that a threat actor will exploit a vulnerability to gain unauthorized access to a resource of a computing system
806 risk assessor code; may also be referred to as "risk assessment code"; this is explicitly executable software supported by computing hardware, or another machine such as an ASIC, as opposed to a human who is considering risks
808 pair, i.e., an actor-id plus a resource-id; a pair represents an access attempt; although "pair" in lay terms refers to two items, a pair 808 may include more than the actor-id and a resource-id, e.g., it may have one or more timestamps, checksums, flags, source indicators, and so on
810 recommendation score
812 cluster of pairs
814 cluster code which upon execution attempts to create clusters 812
816 tuning code which upon execution attempts to tune a machine learning model 802
818 explanation code which upon execution attempts to display content that may help explain grounds for a recommendation score or a risk assessment
820 content that may help explain grounds for a recommendation score or a risk assessment 822 interfaces (APIs, URLs, shared logs, and so on) to a system 800
900 items related to a machine learning model
902 recommender (software operating in conjunction with supporting hardware)
904 collaborative filtering code
906 sparse matrix used in some implementations of collaborative filtering
908 functions and other code used in calculating ratings 606
910 tuples used in testing a machine learning model; may have the same format as a training-tuple 600 to facilitate testing ratings 606 produced by machine learning model in response to id portion 202 and 208 of a tuple 910 against rating 606 in that test tuple 910
912 tuples used in tuning a machine learning model; may have the same format as a training-tuple 600 to facilitate tuning ratings 606 produced by machine learning model in response to id portion 202 and 208 of a tuple 912 against rating 606 in that tuning tuple 912; a dataset of tuples generally may be partitioned or otherwise divided (e.g., for cross-validation) into a training dataset 600, a testing dataset 910, and a tuning dataset 912
914 latent features of a machine learning model
916 code which performs matrix factorization in a collaborative filtering machine learning model
1000 machine learning model hyperparameters, i.e., parameters whose values often impact the efficiency, correctness, speed, or other performance characteristic(s) of the machine learning model, and which can be imposed independently of the model's content and status as opposed to learned parameters which can be derived automatically from datasets used in training/testing/tuning the model
1002 the number of latent features in a machine learning model; may also be referred to as the "rank" of the machine learning model
1004 maximum number of iterations performed within the machine learning model in response to being fed a tuple; at the end of the iterations a recommendation score is output by the machine learning model
1006 iterations performed within the machine learning model in response to being fed a tuple; at the end of the iterations a recommendation score is output by the machine learning model
1008 fitting accuracy of model with respect to the training dataset; sometimes referred to as the model's "regularization"
1010 learning rate of a machine learning model
1100 cybersecurity actions, i.e., actions which monitor security in a computing system, assess risk therein, accept risk therein, mitigate risk therein, or communicate about risk therein
1102 action which mitigates risk in a computing system
1104 prevention of one or more operations in a computing system, e.g., denying access, stalling, killing a connection
1106 termination of one or more operations in a computing system
1108 generating or sending an alert about a state or event detected in a computing system, thereby alerting a human or a software process or both, e.g., by text, email, visible alert, signal, or other alert transmission
1110 flagging a data structure, storage item, or other artifact in a computing system to denote a risk or indicate further investigation is prudent
1112 action which accepts risk in a computing system, e.g., by moving on to process a different detected state or detected event instead of pursuing additional processing of the action(s) associated with the accepted risk
1114 marking a data structure, storage item, or other artifact in a computing system to denote an accepted risk or indicate further investigation is not deemed prudent
1116 making a log entry
1118 executing code that allows an operation in a computing system or selecting an execution path which does so, when code is also present that would attempt to prevent or terminate the operation if it had been executed instead of the code that allows the operation
1120 access to a resource in a computing system
1200 dataflow in an example architecture that includes both creating a trained model and utilizing the trained model for risk management
1202 training a machine learning model
1204 testing a machine learning model; may also be referred to as "validating" the model
1206 tuning a machine learning model, that is, performing operations to improve one or more performance characteristics of the model, such as memory usage efficiency, execution speed, fitting accuracy, perceived clarity of relationships between latent features and recommendation score, and so on
1208 one or more threshold values used in risk assessment code
1210 risk assessment, e.g., risk score in a specified range or risk category in a specified set of categories (e.g., high/medium/low, red/yellow/green)
1212 selection of a cybersecurity action ("selection" in question may be a noun or a verb)
1214 model creation phase
1216 model utilization phase
1300 cybersecurity methods (one flowchart may be traversed in different ways, so one flowchart represents multiple methods in that sense)
1302 forming a pair 808
1304 assessing an access attempt represented by a pair for the risk that the access attempt was not authorized
1306 computing a recommendation score
1308 performing collaborative filtering to compute a recommendation score
1310 taking an action based on a recommendation score or based on a risk score that is based on the recommendation score
1312 obtain a risk score based on the recommendation score
1314 detecting an attempt to access a storage item or other resource
1400 flowchart
1402 feed a pair 808 to a machine learning model to get a recommendation score
1404 receive a recommendation score
1406 invert a recommendation score
1408 interpret a value as a risk measure
1410 a measure of risk, e.g., a risk score or threat level
1412 perform operations to obtain a matrix factorization
1414 a matrix factorization
1416 calculate a rating 606
1418 give relative weight to values (access attempt counts) used in calculating a rating, e.g., by giving greater weight to lower values
1420 weight given to values (access attempt counts) used in calculating a rating
1422 cluster pairs or pair components (actor-id, resource-id) in a machine learning model, e.g., by using k-means clustering, mean-shifting clustering, density-based spatial clustering, agglomerative hierarchical clustering, or another procedure

1424 display an explanation of a risk assessment

1426 submit a pair 808 to a risk assessor code

1428 communicate between components in a computing environment

1430 components in a computing environment

1432 operating in a cloud

1434 read data from a resource

1436 request data be read from a resource

1438 write data to a resource

1440 request data be written to a resource

1442 connect to a resource

1444 request a connection to a resource

1446 submit a command to a resource

1448 a command that can be or has been submitted to a resource

1450 use a recommendation score inversion together with other intrusion risk measures, e.g., together with a conventional intrusion detection system or conventional intrusion prevention system in a layered defense against cyberattacks

1452 any other step displayed, recited, discussed, or otherwise taught in the present disclosure, which is not otherwise assigned a drawing reference number Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory. Software processes may be users 104.

In some embodiments, the system includes multiple computers connected by a wired and/or wireless network 108. Networking interface equipment can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Storage Environments

With reference to FIGS. 1 through 14, an operating environment 100 may overlap or include one or more storage environments, such as a local environment or a remote environment. Some embodiments operate 1432 in a cloud 700, while others do not involve a cloud.

Figure 2:
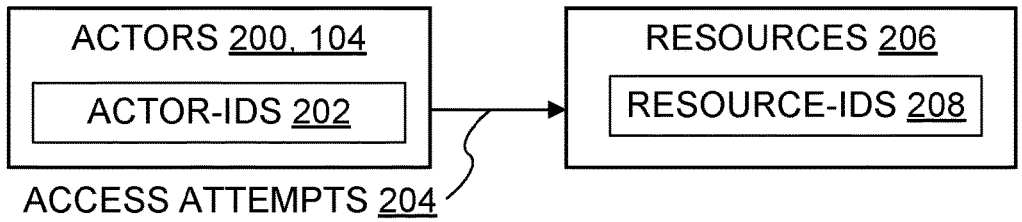
FIG. 2 is a block diagram illustrating aspects of attempts by actors to access resources of a computer system.

As illustrated in FIG. 2, an actor 200 includes or is associated with one or more users 104. The actor 200 has one or more actor IDs 202. For example, an individual user may have actor IDs that include a username 306 or user account number 314, which is used for multiple accesses, and may be attempting a particular access with a request 204 that originates from an application program 124 that is using a particular source IP address 302 and source port 304. As another example, an actor 200 may be a program, such as a file transfer program, which authenticated anonymously (no username, or generic username such as "guest") but nonetheless sends the access request 204 using a particular source IP address 302 and source port 304. The access request 204 seeks access to one or more items 502 in storage, and includes a storage item ID 208 to identify the item(s) for which access is requested. Permissions may be associated with the actor (e.g., a token), with the storage item (e.g., an ACL or file system permission), or both.

Figure 3:
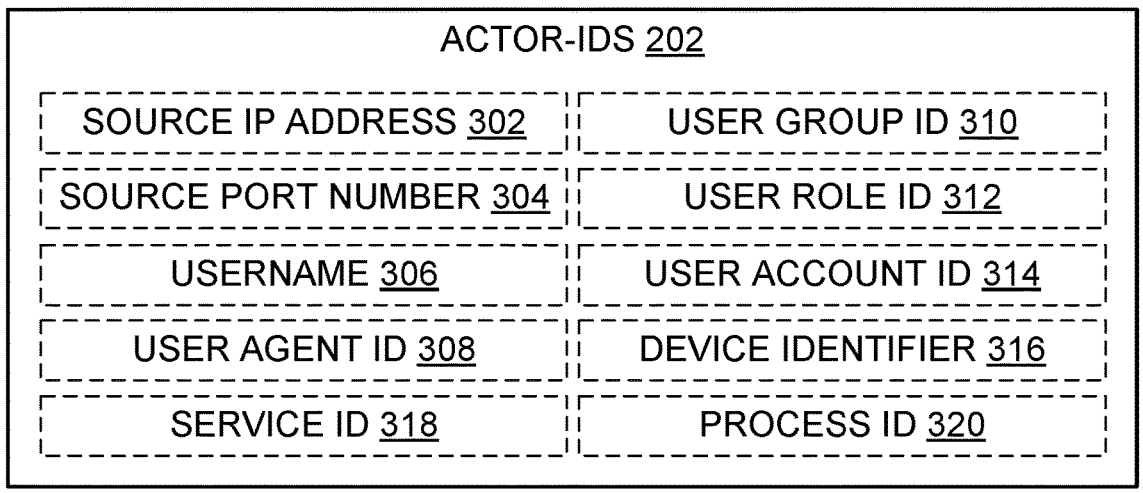
FIG. 3 is a block diagram illustrating actor identifications, which are also referred to as "actor-ids"

FIG. 3 illustrates examples of actor IDs 202. An "actor ID" is a characteristic, property, attribute, or other value associated with a user, device, or other entity that is seeking access to a storage item or other resource 206, which value fully or partially identifies that entity relative to other entities that have accessed the resource or have the technological capability to attempt to access the resource. Illustrated examples of actor IDs 202 include a source IP address 302, source port number 304 for TCP or UDP or another transport protocol, alphanumeric username 306, user agent ID 308, user group ID 310, user role ID 312, internal user account ID 314, or device identifier 316 such as an IP address or MAC address, service identifier 318, or process identifier 320.

Figure 4:
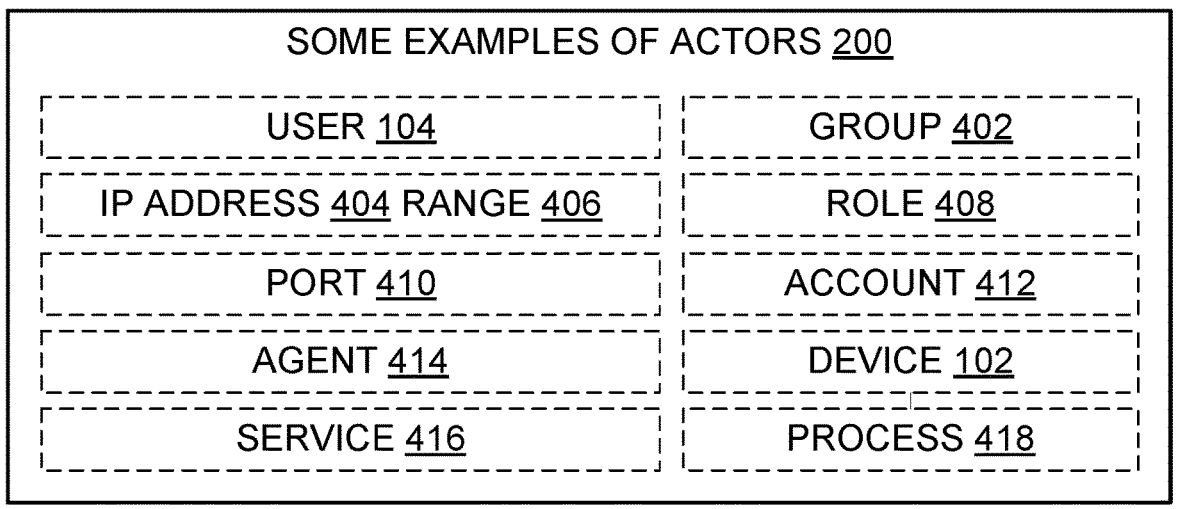
FIG. 4 is a block diagram illustrating some examples of actors.

FIG. 4 illustrates examples of actors 200. Illustrated examples include users 104, groups 402, individual IP addresses (IPv4 or IPv6) 404 (e.g., source IP 302) and IP address ranges 406 (e.g., 10.0.0.0-10.255.255.255, 192.168.0.15/24, 2001:db8::1:0:0:1), roles 408 recognized for security purposes, ports 410 (e.g., source ports 304), accounts 412, software agents 414, devices 102, services 416 (with ID 318), and processes 418 (with ID 320).

Figure 5:
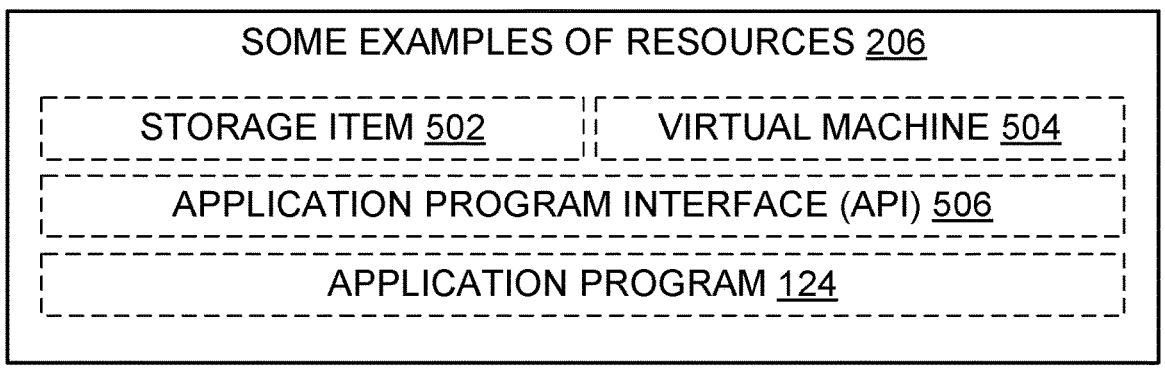
FIG. 5 is a block diagram illustrating some examples of resources.

FIG. 5 illustrates examples of resources 206. Illustrated examples include storage items 502 (further described in FIG. 7), virtual machines 504, APIs 506, and application programs 124.

Figure 6:
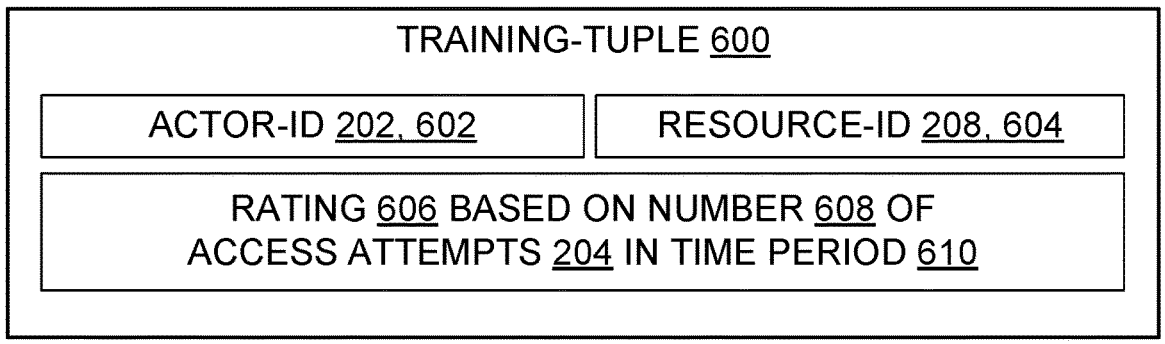
FIG. 6 is a block diagram illustrating aspects of a training-tuple.

FIG. 6 illustrates training-tuples 600. These tuples may include an actor-id 202 (which may also be designated at 602 to indicate presence in a training-tuple), a resource-id 208 (which may also be designated at 604 to indicate presence in a training-tuple), and a rating 606. The rating 606 is calculated based on the number 608 of access attempts within an implicitly or explicitly defined period 610 of time. Ratings 606 may be calculated using functions 908, which may give 1418 different weights 1420 to different levels of the attempt number 608, e.g., by assigning weight a logarithmic function 908 of that number 608. Some embodiments create a training set from a group of user-resource accesses in part by getting an access count 608 and normalizing per time. Thus, the count for a period 610 of one month and the count for a period of one week could both be normalized to a count that represents an average number of access attempts per hour.

Figure 7:
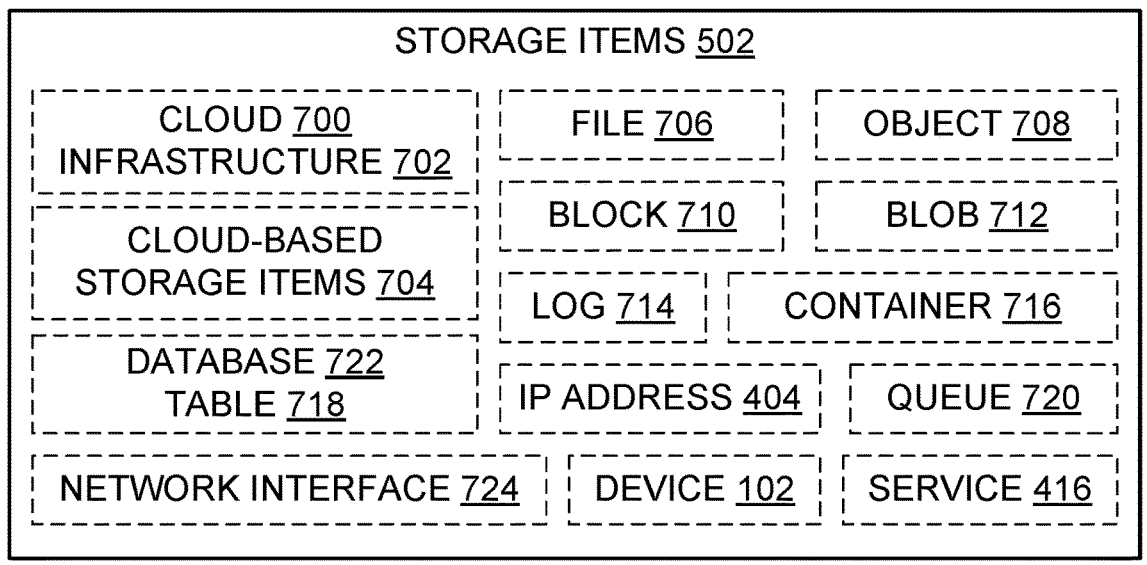
FIG. 7 is a block diagram illustrating storage items.

FIG. 7 illustrates examples of storage items 502. In some embodiments, a "storage item" is a unit of storage allocation identified in an access request from an actor. Individual bits and bytes are storage, but in most computing systems they cannot be individually allocated, so they are not units of storage allocation and hence they are not—individually—storage items. It is expected that many, perhaps most, storage items will be logical or virtual as opposed to a physical cluster or sectors; they will be defined at a level that is visible to end users 104 as individual items, e.g., as a file 706 or blob 712 or table 718. Illustrated examples of storage items 502 include files 706, objects 708, blocks 710, blobs 712, logs 714, containers 716, tables 718, queues 720, databases 722, and network interfaces 724.

It is expected that in many environments of interest, storage items 502 will be located in a cloud 700 as cloud-based storage items 704, 502 which are allocated by a cloud service 416 using infrastructure 702. In a given situation, the infrastructure 702 may provide redundancy through parity, replication, or other mechanisms, and may provide access efficiencies through load balancing or decisions about which devices actually hold the stored data, for example. The infrastructure 702 also maps between physical storage devices and the logical view of a storage item that is presented to users.

Figure 8:
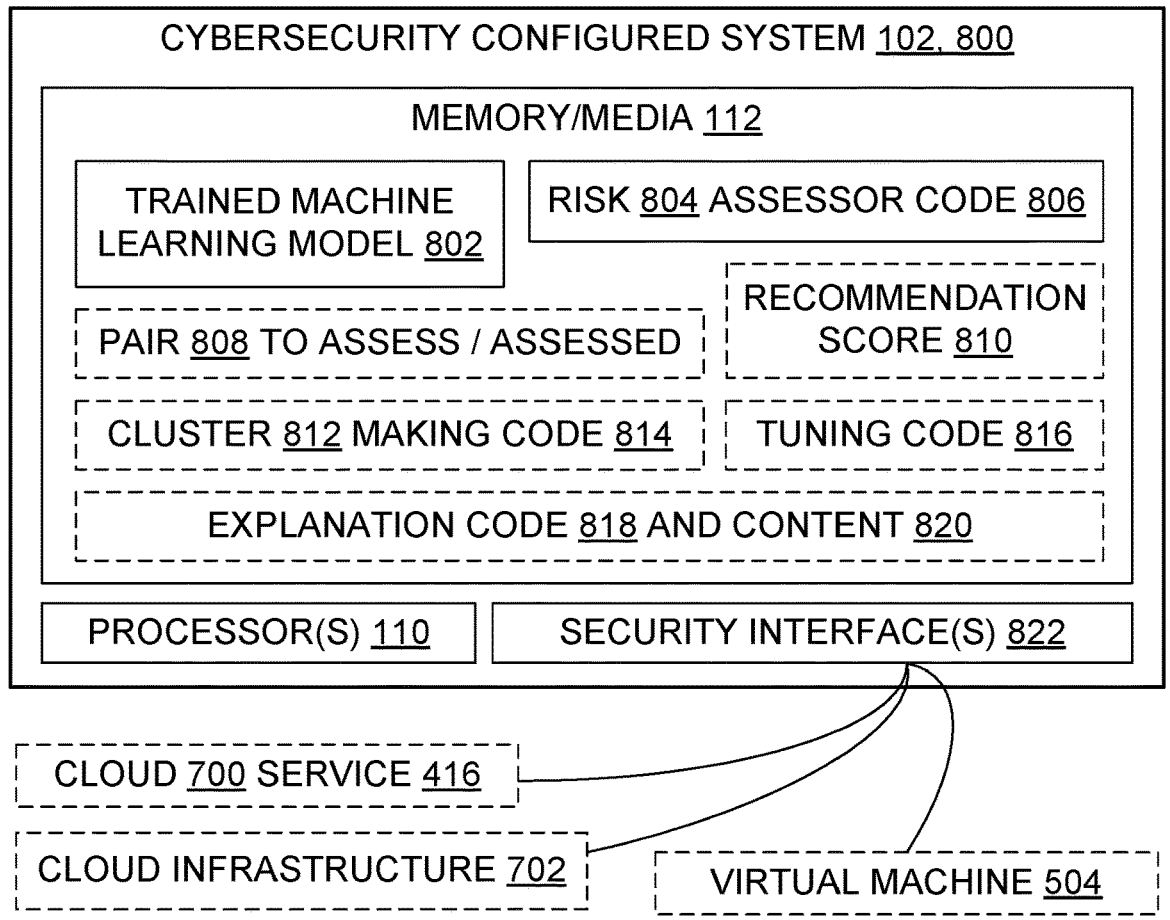
FIG. 8 is a block diagram illustrating aspects of a system which is configured for cybersecurity using a collaborative filtering adaptation.
Figure 9:
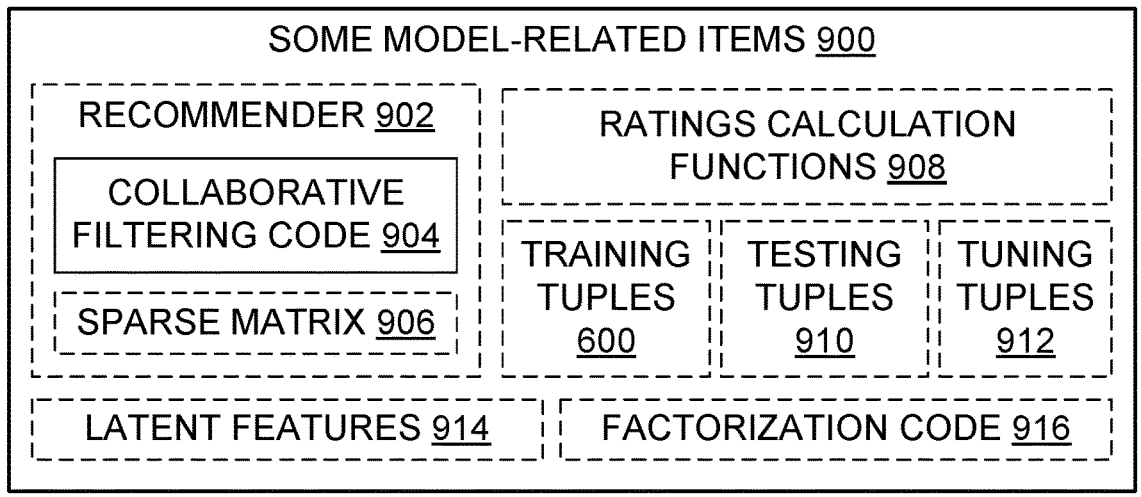
FIG. 9 is a block diagram illustrating some items related to a machine learning model.

FIGS. 8 and 9 help illustrate a system 102 which is configured with cybersecurity enhancements according to some of the teachings herein to provide a cybersecurity configured system 800. A recommender 902 uses collaborative filtering code 904 to produce recommendation scores 810 for respective pairs 808 of actor IDs 202 and resource IDs 208. The recommender 902 may contain, reside in, or communicate 1428 with a trained machine learning model 802, risk assessor code 806, one or more cloud 700 components 1430, or other components 1430, e.g., intrusion detection using the recommender 902 and risk assessor 806 may be provided as a service 416 or as part of an infrastructure 702. The recommender 902 or risk assessor 806 or both may instead or in addition reside in a virtual machine 504, e.g., in a virtual firewall.

Each actor ID 202, paired resource ID 208, and respective assigned recommendation score 810 resides in and configures memory 112 at some point in time. A given actor ID 202 may appear in zero or more tuples. A given resource ID 208 may appear in zero or more tuples. One or more instances of a given recommendation score 810 may be produced from feeding one or more different pairs to the model 802. In some embodiments, the recommendation score 810 is computed 1306 on demand, when the actor-id, resource-id tuple sporadically occurs in a network event. The computation may happen in a risk assessor component, and the recommendation score 810 might be cached for later use.

While the tuples 600 used to train 1202 the model 802 may consist of or contain three values (actor-id 202, resource-id 208, implicit-feedback a.k.a. rating 606), the tuples 910 used to test the model and the tuples 808 that feed the model may consist of or contain two values (actor-id 202, resource-id 208, without any rating 606 present). An embodiment may calculate 1416 the implicit rating in the training stage and feed it to the algorithm 802 in order to train and build the model 802. After the training stage, the model is ready to estimate the corresponding implicit feedback on its own, even on never before seen actor-id and resource-id combinations.

Figure 10:
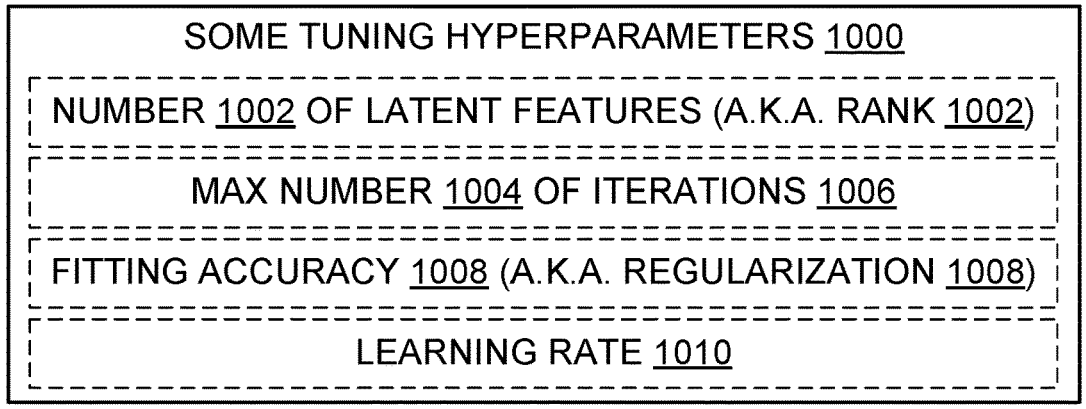
FIG. 10 is a block diagram illustrating some hyperparameters that may be used in tuning some machine learning models.
Figure 11:
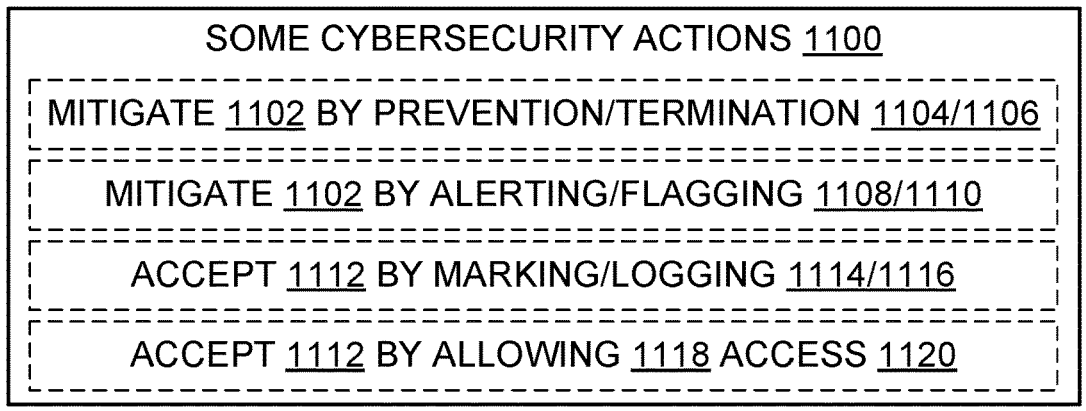
FIG. 11 is a block diagram illustrating some examples of cybersecurity actions.

FIG. 10 illustrates some hyperparameters 1000 that may be used to tune 1206 a model 802. Different embodiments may use all, some, or none of the illustrated hyperparameters 1000, and may also or alternately use other hyperparameters than those shown. Illustrated hyperparameters 1000 include rank 1002, a maximum 1004 constraint on the number of iterations 1006 performed, a regularization 1008 to avoid overfitting the model to a particular dataset, and a learning rate 1010. Some embodiments utilize user bias or resource bias as hyperparameters 1000.

One of skill will acknowledge that in familiar recommendation systems used to promote product or service purchases, latent features may represent or behave as hidden tastes or personalization properties. Consider as an example a matrix factorization implementation for movie recommendations. In that context, the users are customers and the resources are movies. The latent features form a plane where customers and movies exist together. These features may correspond to movie tastes or preferences. For example one latent feature might represent how thrilling a movie is perceived to be, and another latent feature might represent how dramatic a movie is perceived to be. These are abstracted preferences that both customers and movies can be referenced upon. These features are also independent of each other.

In some embodiments presented herein, latent features may represent abstracted user or resource preferences. For example, a latent feature 914 may indicate whether a resource is financially oriented, while another latent feature indicates whether a resource is perceived as long or as short. The latent features may be hidden, but still represent clusters of users/resources with similar tastes.

A rank k 1002 represents the number of expected latent features 914. The lower it is, the less personalization is allowed for users/resources. The higher it is, the more specific a model may become when defining user/resource relations. Rank 1002 may be chosen using cross validation (with a dev-dataset) or by a domain expert, for example.

More About Systems

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Some embodiments use or provide a cybersecurity configured system 800. The system 800 includes at least one processor 110 and a digital memory 112 in operable communication with the processor. Also present is a machine learning model 802 which has been trained using a collection of training-tuples 600. Each training-tuple 600 includes a training-tuple actor-id 602 identifying a training-tuple actor 200, a training-tuple resource-id 604 identifying a training-tuple resource 206 in a guarded computing system (GCS) 130, and at least one rating 606 which is based on how many times 608 the training-tuple actor attempted to access the training-tuple resource.

Also present in this system 800 is a risk assessor code 806 which upon execution by the processor 110 performs a risk assessment 1210 process. The risk assessment 1210 process 1200, 1300, 1400 includes feeding 1402 a pair 808 to the machine learning model. The pair includes a pair actor-id 202 identifying a pair actor 200 and a pair resource-id 208 identifying a pair resource 206 in the GCS 130. The risk assessment 1210 process 1200, 1300, 1400 also includes receiving 1404 from the machine learning model a recommendation score 810 which is computed 1306 at least in part by collaborative filtering 1308 that is based on at least training 1202 from a plurality of the training-tuples 600. The risk assessment 1210 process 1200, 1300, 1400 also includes performing 1310 at least one cybersecurity action 1100 based on the recommendation score, including at least one of: a risk acceptance action 1112 which accepts 1112 a risk R 804, and a risk mitigation 1102 action 1102 which aids mitigation 1102 of the risk R 804. R denotes a risk 804 that the pair 808 represents an unauthorized attempt 204 by the pair actor 200 to access the pair resource 206. The recommendation score 810 has an inverse relationship 1406 to the risk R, whereby the more highly recommended a given pair is by the recommender 902, the greater the risk 804 that is associated with that pair.

In some embodiments, the actor-ids 202 each identify at least one of the following: a username 306, an account 412, a group 402 of accounts, a role 408, an agent 414, a service 416, a process 418, a device 102, one or more IP addresses 404, or one or more ports 410.

In some embodiments, the resource-ids 208 each identify at least one of the following: a storage resource 502, a virtual machine 504, a database 722, a database table 718, an application program interface 506, one or more IP addresses 404, a device 102, an object 708, an application program 124, a network interface 724, a service 416, a blob 712, a block 710, a log 714, a queue 720, a container 716, or a file 706.

In some embodiments, a plurality of the training-tuple ratings 606 give 1418 greater relative weight 1420 to lower access attempt counts 608 than to higher access attempt counts 608. For example, ratings 606 may be calculated as a logarithmic function of the attempt count 608.

In some embodiments, an optimization codes portion of the system's model creation phase 1214 includes or uses a ratings calculation code 908 which upon execution calculates 1416 training-tuple ratings based on at least one of the following, wherein N represents how many times 608 the training-tuple actor attempted to access the training-tuple resource: a logarithmic function of N, a linear scaling function of N, a summation function of N, an averaging function of N, or a normalization function of N. One of skill will acknowledge that linear scaling scales all ratings to predetermined range, and may serve as an alternate to logarithmic calculations.

In some embodiments, an optimization codes portion of the system's model creation phase 1214 includes or uses a tuning code 816 which upon execution adjusts 1206 at least one of the following hyperparameters 1000 of the machine learning model 802: a number 1002 of latent features, a maximum number 1004 of iterations, a fitting accuracy 1008, or a learning rate 1010. Tuning may include optimizing the model's capability to predict, and evaluating it by this same accuracy or other measures applied during utilization 1216. In some embodiments, the learning rate 1010 is tuned to promote convergence. When the learning rate is too high, model results may zigzag around an optimum and when the learning rate is too low obtaining model results may take more iterations than deemed acceptable for a given implementation.

In some embodiments, an optimization codes portion of the system's model creation phase 1214 includes or uses a clustering code 814 which upon execution clusters 1422 actors-ids and resource-ids based at least in part on co-occurrence. In some, the machine learning model 802 comprises clustered pairs 812.

In some embodiments, the model utilization phase 1216 (at least) has a machine learning model 802 that includes matrix factorization code 916. In some embodiments the recommender 902 includes code 904, 916 configured to upon execution perform at least one of the following: a singular value decomposition, a principal component analysis, a probabilistic matrix factorization, or a non-negative matrix factorization. Thus, the recommender may leverage existing libraries for singular value decomposition, principal component analysis, or matrix factorization, by executing them as part of a risk analysis instead of for their familiar use in producing a product or service purchase recommendation; recommendation results 810 are inverted 1406 during risk assessment. In some embodiments, the system includes a sparse matrix 906 of actor IDs 202 and resource IDs 208. Libraries for processing a sparse matrix during collaborative filtering may then also be leveraged for use in cybersecurity risk assessment as taught herein.

In some embodiments, the model utilization phase 1216 (at least) has an explanation code 818 which upon execution displays one or more of the following as explanation content 820: a training-tuple actor-id 602 which contributed to the recommendation score 810, a training-tuple resource-id 604 which contributed to the recommendation score 810, a name or description or both of a latent feature 914 of the trained machine learning model which has a qualitative correlation with the recommendation score 810, a recommendation score threshold 1208 for performing a risk acceptance action 1112, or a recommendation score threshold 1208 for performing a risk mitigation action 1102.

In some embodiments, a system 800 for identifying behavior anomalies in a secure computing environment includes: a processor 110; a memory 112 in operable communication with the processor; a training data set 600; access matrix generation code 902, 904 which upon execution with the processor computes from the training data set a matrix R having m rows and n columns, wherein a matrix element Rij at location (i, j) in R includes a value representing an average number of times a user user-i accessed a resource resource-j during a specified time period according to the training data set, wherein the elements Rij are normalized to have a mean of 0.0 and a standard deviation of 1.0; matrix factorization code 916 which upon execution with the processor computes from the matrix R a matrix U and a matrix P, U having m rows and k columns, P having k rows and n columns, with R being the matrix product of U multiplied by P; and threat score calculation code 806 which upon execution with the processor calculates for each pair (i, j) a threat score as the scalar vector multiplication of the ith row of U by the jth column of P.

Methods

Figure 12:
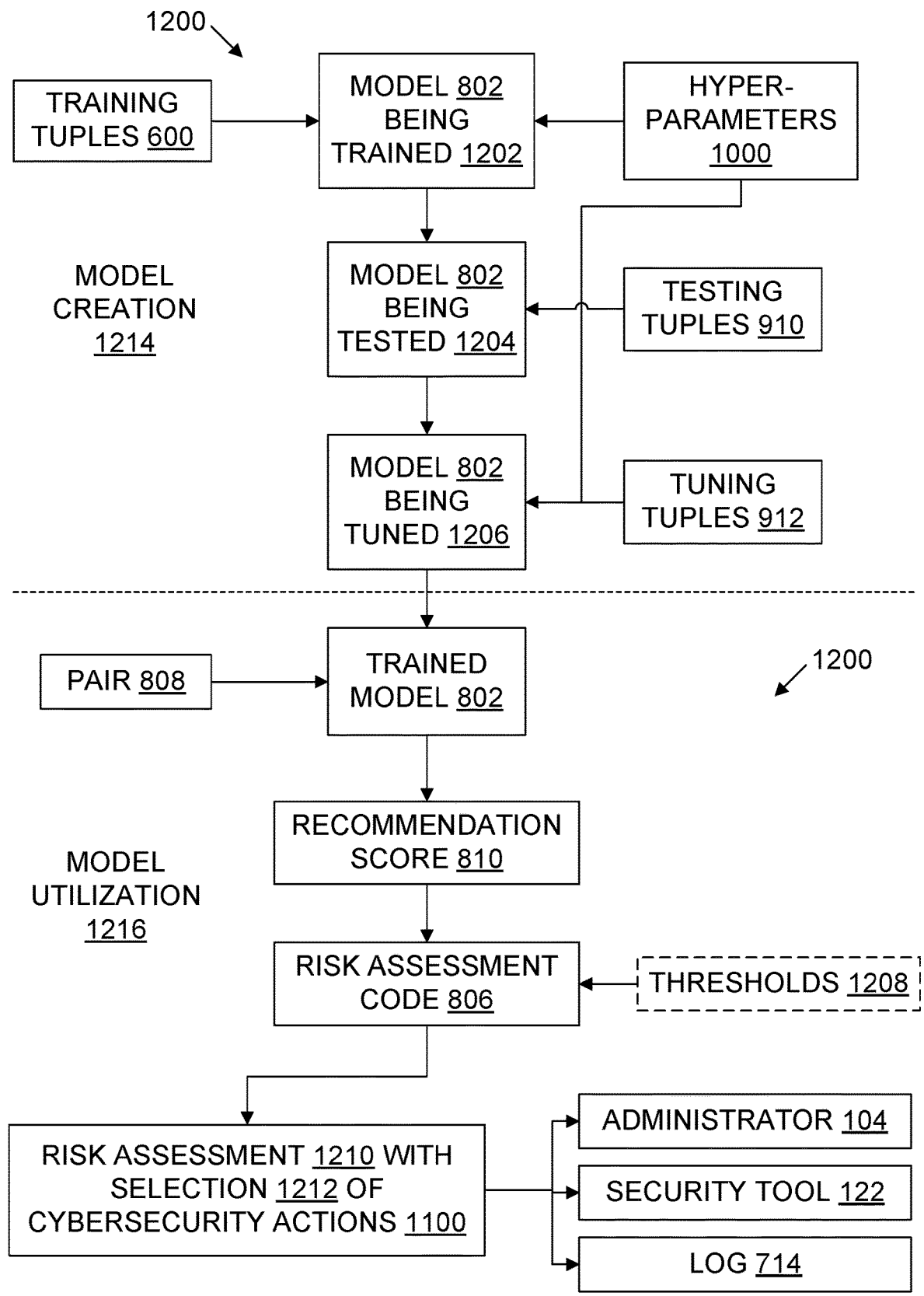
FIG. 12 is a data flow diagram illustrating some aspects of machine learning model training, testing, tuning, and usage in selecting cybersecurity actions.

FIG. 12 illustrates data flow in some embodiments, and thus helps illustrate both systems and methods. One of skill will acknowledge that a given embodiment may include both phases shown (model creation 1214 and model utilization 1216), or include only one of those phases. Also, the different phases 1214, 1216 may be implemented at different locations, different times, by different entities, or a mixture of such differences. Also, some of the flows shown may be repeated, e.g., an embodiment may loop through training 1202, testing 1204, and tuning 1206 multiple times. Steps may be reordered, e.g., testing 1204 may be done after tuning 1206. Steps may be repeated, or omitted.

In some embodiments, a data flow architecture may be accurately described as being consistent with the following: An input tuple whose format includes (user-id, resource-id) →[machine learning model which performs collaborative filtering; model was trained 1202 using training tuples that have a format (user-id, resource-id, #access attempts in N hours)]→recommendation score→compare recommendation score to threshold→alert or investigate further if recommendation score is lower than threshold, because low recommendation corresponds to high risk.

As one alternative or enhancement of such a data flow architecture, in some embodiments data flow is consistent with the following: An input tuple whose format includes (user-id, resource-id)→[machine learning model which performs collaborative filtering; model was trained 1202 using training tuples that have a format (user-id, resource-id, #access attempts in N hours) and clustered users and resources together based on their co-occurrence as derived from a matrix produced by the model]→recommendation score→compare recommendation score to threshold→optionally alert or investigate further if recommendation score is lower than threshold, because low recommendation corresponds to high risk→optionally explain to customers some logic behind the perceived recommendations, using the clustering. As with other examples herein, orders may differ in different embodiments unless the result of one step is used as input to another step.

Figure 13:
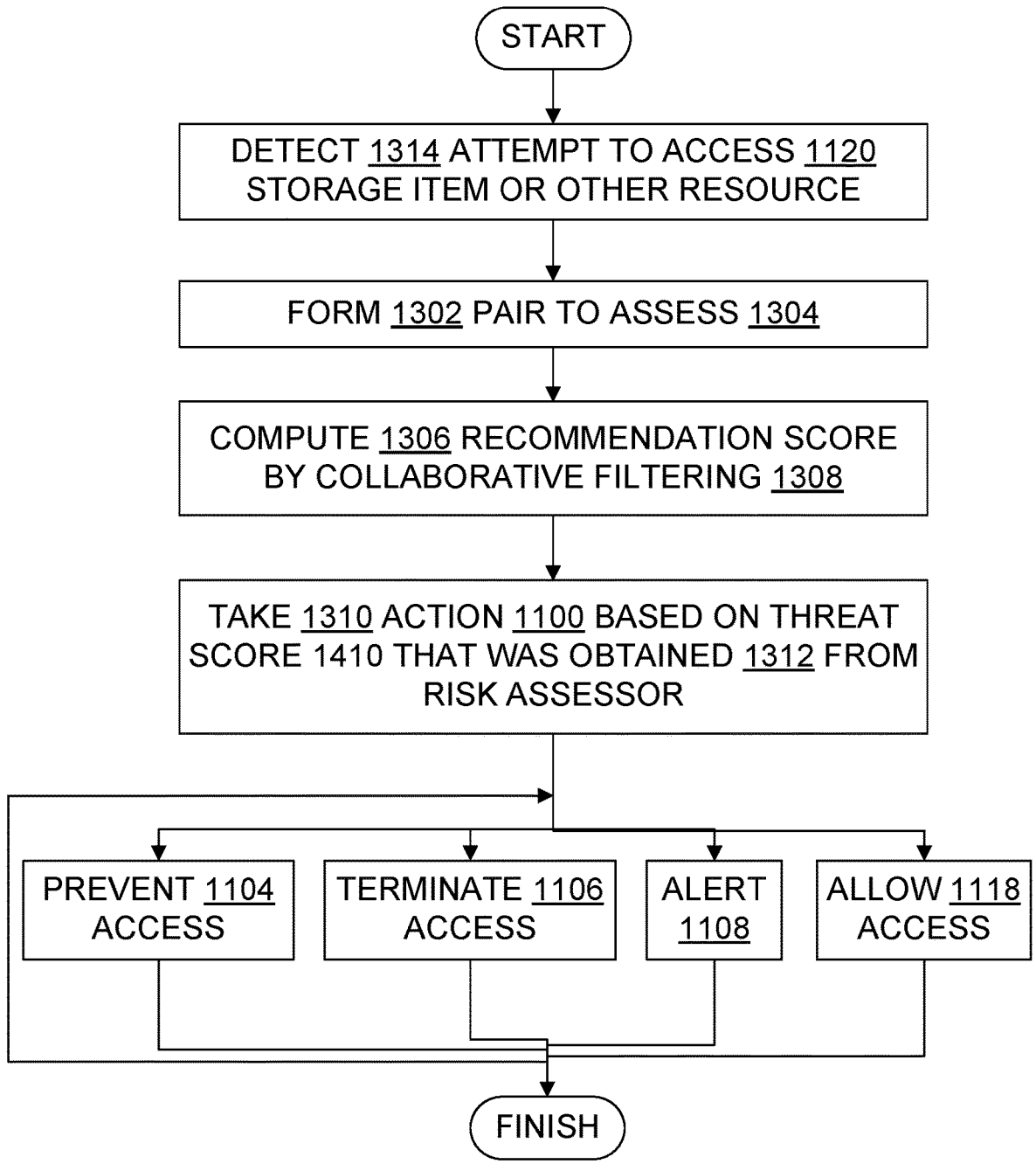
FIG. 13 is a flowchart illustrating example cybersecurity methods.

FIG. 13 illustrates a method 1300 which is an example of methods performed or assisted by a recommender 902 and risk assessor 806. This method includes detecting 1314 an attempt 204 to access a storage item or other resource, e.g., by funneling access attempts through a service 416, or through a firewall or IDS or IPS system 122. Then a pair to score is formed 1302, e.g., by extracting the resource ID and actor ID from the request 204 and placing them in a pair 808 data structure. Next, the method computes 1306 a recommendation score by collaborative filtering 1308, e.g., as described herein using other tuples 600 and by using leveraged implementations of familiar collaborative filtering libraries. Then the system 800 or related components 416, 702, 504 performing the method 1300 take 1310 some action 1100 based on the recommendation score, or equivalently based on a corresponding intrusion risk score 1410 which behaves inversely to the recommendation score. Some possible actions 1100 include preventing 1104 access to the storage item or resource identified in the request, terminating 1106 an access-in-progress to the storage item or resource identified in the request, alerting 1108 an administrator (a person), or actively allowing 1118 the access after comparison of the recommendation score to pertinent threshold(s) 1208 subject to 1408 the inverse relationship 1406 between recommendations and risk measures. Some embodiments evaluate 1204 and train 1202 an algorithm 802 in part by using the algorithm 802 as a predictor of access count 608, estimating a count 608 for a user-resource pair 808, and testing the estimate against the actual count to detect anomalies.

Figure 14:
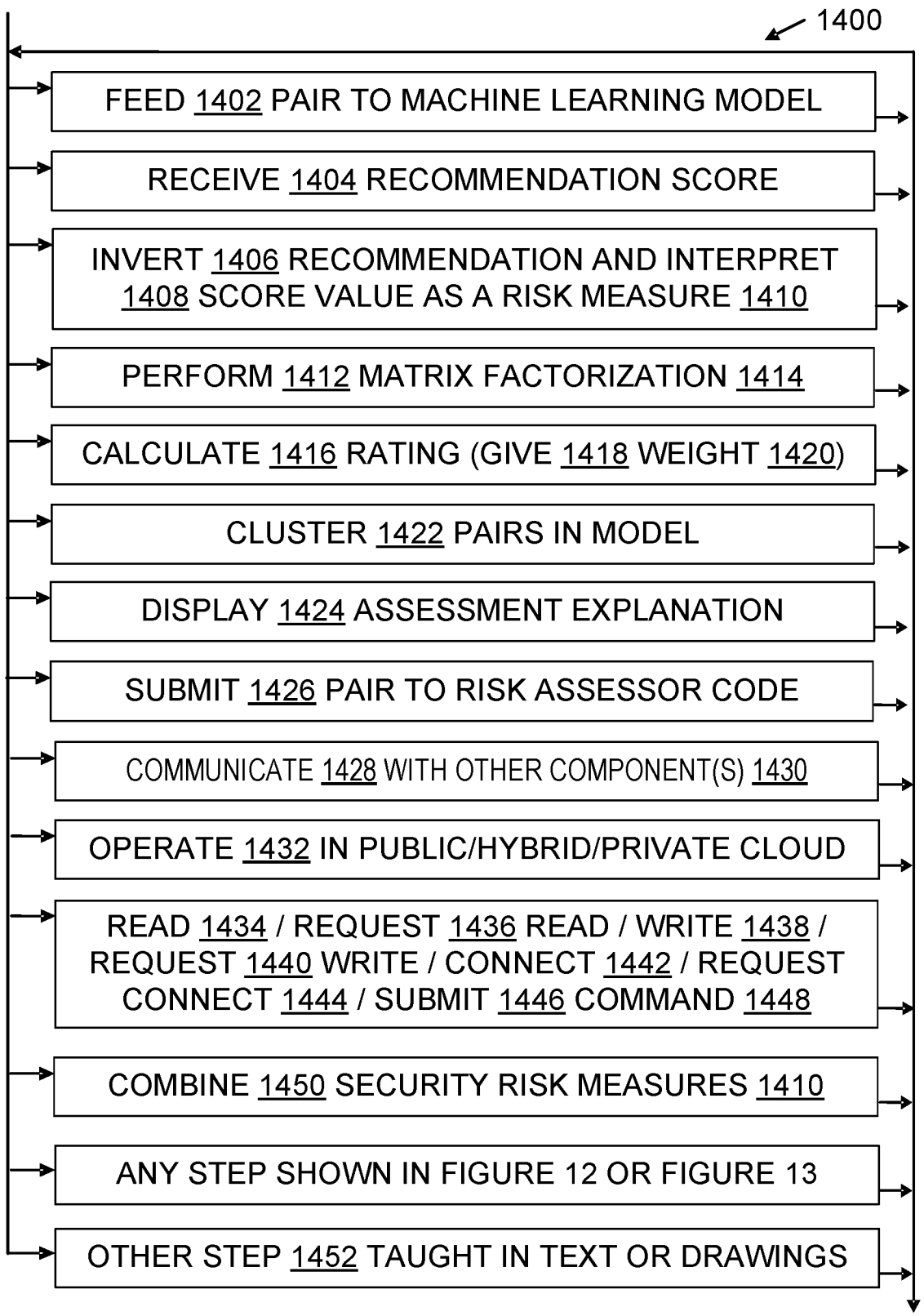
FIG. 14 is a flowchart further illustrating steps in some cybersecurity methods.

FIG. 14 further illustrates some method embodiments in a general flowchart 1400. Technical methods shown in the Figures or otherwise disclosed will be performed automatically, e.g., by cybersecurity system 800, unless otherwise indicated. Methods may also be performed in part automatically and in part manually to the extent action by a human administrator or other human person is implicated, e.g., a person may set thresholds 1208 that determine which action 1100 is taken. No method contemplated as innovative herein is entirely manual. In a given embodiment zero or more illustrated steps of a method may be repeated, perhaps with different parameters or data to operate on. Steps in an embodiment may also be done in a different order than the top-to-bottom order that is laid out in FIG. 14. Steps may be performed serially, in a partially overlapping manner, or fully in parallel. The order in which flowchart 1400 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Some embodiments use or provide a computer-implemented process for providing or improving cybersecurity by detecting anomalies in resource access behaviors. In some embodiments, a cybersecurity method includes forming 1302 a pair 808 in response to an actor attempting 204 to access a resource of a guarded computing system (GCS). The pair includes an actor-id 202 identifying the actor and a resource-id 208 identifying the resource.

This method also includes submitting 1426 the pair to a risk assessor code which in turn feeds 1402 the pair to a machine learning model 802 which has been trained 1202 using a collection of training-tuples 600. Each training-tuple includes a training-tuple actor-id 602 identifying a training-tuple actor, a training-tuple resource-id 604 identifying a training-tuple resource, and at least one rating 606 based on how many times the training-tuple actor attempted to access the training-tuple resource. The machine learning model is configured to perform collaborative filtering 1308.

This method also includes receiving 1404 from the machine learning model a recommendation score of the pair computed 1306 using collaborative filtering. This method implements an inverse relationship 1406 between the recommendation score and a risk score, whereby a high recommendation score corresponds to a low risk score and a low recommendation score corresponds to a high risk score.

This method also includes performing 1310 at least one of the following cybersecurity actions 1100 based at least in part on the risk score or recommendation score or both: mitigating 1102 a risk by preventing 1104 or terminating 1106 access by the actor to the resource, mitigating 1102 a risk by alerting 1108 an administrator, mitigating 1102 a risk by alerting 1108 a security tool, mitigating 1102 a risk by flagging 1110 the actor or the resource or both as a candidate for further security investigation, accepting 1112 a risk by marking 1114 the pair as accepted, accepting 1112 a risk by logging 1116 the pair as accepted, accepting 1112 a risk by allowing 1118 the actor to access the resource, or accepting 1112 a risk by allowing 1118 the actor to continue an access to the resource which has started.

In some embodiments, the method also includes training 1202 the machine learning model using a training set of training-tuples.

In some embodiments, forming 1302 the pair responds to an attempted access by the actor which includes at least one of the following: reading 1434 data from the resource, requesting 1436 data be read from the resource, writing 1438 the resource, requesting 1440 data be written to the resource, connecting 1442 to the resource, requesting 1444 a connection to the resource, or submitting 1446 a command to the resource.

In some embodiments, forming 1302 the pair is further characterized in that the actor-id 202 identifies at least one of the following: a username, an account, a group of accounts, a role, an agent, a service, a process, a device, one or more IP addresses, or one or more ports. In some, forming 1302 the pair is further characterized in that the resource-id 208 identifies at least one of the following: a storage resource, a virtual machine, a database, a database table, an application program interface, one or more IP addresses, a device, an object, an application program, a network interface, a service, a blob, a block, a log, a queue, a container, or a file. In some, both characterizations are accurate.

In some embodiments, the method also includes testing 1204 the machine learning model using a testing set of testing-tuples which includes multiple tuples that were not used as training-tuples. In some embodiments, the method also includes tuning 1206 the machine learning model by adjusting at least one of the following hyperparameters: a number of latent features, a maximum number of iterations, a fitting accuracy), or a learning rate. Some embodiments include both testing 1204 and tuning 1206.

In some embodiments, the method includes calculating 1416 ratings of training-tuples using code which gives 1418 greater relative weight to lower access attempt counts than to higher access attempt counts.

In some embodiments, the method includes displaying 1424 one or more of the following explanatory contents 820: a training-tuple actor-id which contributed to the recommendation score, a training-tuple resource-id which contributed to the recommendation score, a name or description or both of a latent feature of the trained machine learning model which has a qualitative correlation with the recommendation score, a recommendation score threshold for performing a risk acceptance action, or a recommendation score threshold for performing a risk mitigation action.

In some embodiments, the method includes computing 1306 the recommendation score (as opposed to merely receiving computation results), and in some computing the recommendation score includes doing 1412 a matrix factorization 1414. In some embodiments, computing 1306 a recommendation score includes performing a model-based collaborative filtering 1308. Those of skill in the collaborative filtering art will understand that in the present context model-based collaborative filtering may use techniques and tools such as data mining, machine learning, Bayesian networks, clustering models, and Markov decision process models to predict recommendation scores. Model-based approaches may perform singular value decomposition, or perform principal component analysis, for example. Some embodiments use 1306 a combination of memory-based collaborative filtering and model-based collaborative filtering, e.g., by averaging scores from each.

In some embodiments, the method computes 1306 a recommendation score of less than 0.15 on a scale where the threshold value 0.0 represents entirely abnormal behavior and the threshold value 1.0 represents entirely normal behavior. Equivalently, the process may compute 1306 a low recommendation score on another scale, e.g., from one to ten, or a scale from zero to one hundred. In some embodiments, the one or more actions 1100 which are taken 1310 based at least in part on the computed recommendation score exclude the action of allowing 1118 the attempted access. Any other step identified herein may also be excluded from a particular embodiment.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as collaborative filtering code 904, scored pairs 808 and pairs to be scored, training-tuples 600 or machine learning model 802 trained with them, risk assessor code 806, explanation code 818 and content 820, and recommendation scores 810, for example, in the form of data 118 and instructions 116, read from a removable medium 114 and/or another source such as a network connection, to form a configured medium. The configured medium 112 is capable of causing a computer system to perform technical process steps for enhancing cybersecurity by identifying anomalies that correspond to possible intrusions or threatened intrusions to storage or other resources, or exfiltration efforts, as disclosed herein. The Figures thus help illustrate configured storage media embodiments and process embodiments, as well as system and process embodiments. In particular, any of the process steps illustrated in FIG. 12, FIG. 13, FIG. 14, or otherwise taught herein, may be used to help configure a storage medium to form a configured medium embodiment.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

Additional Observations About Collaborative Filtering Based Threat Score for User Actions Moving customer solutions to the cloud increases flexibility for employees and reduces IT costs but it also introduces new challenges and complexities for keeping organizations secure. A malicious user may perform diverse operations on multiple resources 206 that are seemingly legitimate. Challenges include prioritizing the investigation of these operations in a way that is comprehensible and retraceable to a security analyst who manages a security investigation. Note that there may be hundreds of different user operation types, each containing its own unique attributes. Hence, tailoring a model that effectively accounts for all these attributes to compute a threat score to guide a security investigation is a complex task.

Some embodiments presented herein provide or use a model that calculates, in real time, a Threat Score on user actions. The model is applied over real customer data and may be productized as part of a system which provides security insights on users and operations for investigation purposes.

One technical challenges is in evaluating the quality of a given model. For this purpose, some approaches use or provide computationally efficient metrics that allow comparison between different scoring mechanisms.

Customer data may represent user interactions within a customer's enterprise ecosystem. The data may include or consist of network events 204 such as interactive logons, access to resources, file downloads, and other logical user actions in the online workplace. This may involve cloud apps, on premises network traffic, and identity directory logins, for example. Real time data may be acquired through agents and processed to score each event according to the threat it potentially poses to the organization. In addition, data may be stored in blobs for further offline processing and model training.

In particular, one may focus on operations in which a user accesses 1120 a resource. Each access operation may be represented by a triplet containing a unique user id 202 and resource id 208 as well as a count 606 representing the daily average number of times the user accessed the resource. Within a time period of one month, a widely used environment may process tens or hundreds of billions of such events, gathered from actual customer activity with suitable measures to protect privacy (e.g., access control, encryption, strict authorization, anonymization, pseudonymization, data masking, etc.).

Some embodiments describe herein conform to the following example approach. Given a user u and a resource r, a goal is to assign a plausible threat score 1410 for an attempt by u to access r. The threat score may be viewed as an anomaly score indicating the likelihood of user u legitimately accessing resource r, based on historic data. Lower user-to-resource scores indicate that the user is historically unlikely to access the resource. Based on this definition, one can treat this threat score as a prediction score. Hence when a user-resource pair (u, r) gets a low score, this model predicts that u should not access r. This is a hypothesis that can be verified against an unseen dataset. An underlying assumption is that when a user performs operations that are out-of-the-ordinary there is an increased risk that the user is controlled by a malicious insider or an attacker that gained the user's credentials. Hence the problem of calculating a threat score for a user operation is reduced to predicting which user-resource interactions should not occur. For predicting the risk score, some embodiments adapt aspects of a method used in recommender systems, called collaborative filtering 1308. Some such methods automatically make predictions (filtering) about user interests by gathering preferences from other users (collaborating).

In one approach, a dataset is split into a training set 600 containing, e.g., one month of data and a test set 910 containing, e.g., two weeks of future data ("future" meaning after the training data). This approach includes establishing two baseline algorithms to compare the main algorithm against. In this context, the "algorithm" will be the trained machine learning model 802 that uses collaborative filtering to provide predictions. The "predictions" can also be referred to as "recommendation scores" 810 with the understanding that they are actually being used for cybersecurity, not for product recommendations.

A first baseline algorithm is the Memory Model. This algorithm assigns a score to any pair (i, j) according to the average number of daily times user i accessed resource j in the training set. A second baseline algorithm, Resource Popularity, assigns a score for (i, j) according to the average number of unique daily users which accessed resource j. In both these algorithms one normalizes the score to have a mean of 0.0 and a standard deviation of 1.0.

This approach also includes a Collaborative Filtering scoring model. One generates a matrix R of dimensions m by n in which an entry (i, j) is the average number of daily times that user i accessed resource j in the training set. The values in R are also normalized to have a mean of 0.0 and a standard deviation of 1.0. The matrix R is likely sparse as only a small subset of possible user-resource access pairs actually took place in the training. Next, matrix factorization is used to find two matrices U (dimension m by k), a user matrix, and P (dimension k by n), a resource matrix, such that R is the matrix multiplication product U×P. The approach introduces a new quantity, k (the rank) which serves as a dimension of both U and P, where each row in the matrices U and P represent the corresponding user or resource with their k-dimensional latent features. Then for each user-resource pair (i, j), the approach calculates a threat score by performing a scalar vector multiplication of the ith row of U by the jth column of P.

Experimental results provide evidence that Collaborative Filtering is better at predicting anomalous access than the alternative methods considered, as it draws from the access of similar users and similar resources for predicting access. Examining all user-resource pair combinations, one may focus on those access pairs that did not take place in practice, e.g., in a held-out test set. Let U be the set of all users and R be the set of all resources, and define Q in the Cartesian product of U and R as the set of all access pairs and T in Q as a subset of the pairs in the test set. Then one can measure how well an algorithm ranks the pairs with respect to Q/T, the pairs that were not accessed in the test set. That is, the algorithms rank the pairs by the degree of their unlikelihood to occur. An algorithm is considered to be correct about a pair if, in practice (in the test set), the pair did not occur. One can then compute the precision at every correctly ranked pair, and then take an average, which is the Mean Average Precision (MAP). Since most pairs do not occur in practice, one may compare the MAP results of an algorithm such as that embodied in recommender 902 to a Random baseline which ranks the pairs randomly. A comparison of MAP results for Random (~0.9986), Matrix Factorization (~0.9999), Resource Popularity (~0.9993), and Memory Model (~0.9996) approaches revealed that Collaborative Filtering with Matrix Factorization is better at predicting anomalous access than the alternative methods. This may be because it draws training from the access of similar users and similar resources for predicting access. Learning from the actions of similar users and resources yields better results than merely learning from the behavior of a specific user or resource.

Nonetheless, the foregoing is merely one approach. Other approaches are also described herein, including other approaches which use collaborative filtering to help quantify anomalies in unlabeled data.

CONCLUSION

In short, in some embodiments a machine learning model 802 is trained 1202 using tuples 600 that identify an actor 200, a resource 206, and a rating 606. The rating 606 is based on 1416 a normalized count 608 of the actor's attempts 204 to access 1120 the resource. Actors 200 may be users 104, groups 402, IP addresses 404, 406, or otherwise defined; several additional examples are shown in FIG. 4. Resources 206 may be storage items 502, virtual machines 504, APIs 506, or otherwise defined; some additional examples are shown in FIGS. 5 and 7. A risk assessor code 806 feeds an actor-resource pair 808 to the trained model 802, which computes 1310 a recommendation score 810 for the pair 808 using collaborative filtering 1308. The risk assessor inverts 1406 the recommendation score 810 to obtain 1312 a risk measurement 1410; a low recommendation score 810 corresponds to a high risk 804, and vice versa. Inversion 1406 may be explicit in a piece of code, e.g., code that executes an assignment such as risk_score=1−recommendation_score. Inversion 1406 may also be implicit in the comparison tests, thresholds 1208, and actions 1100 take, e.g., code that allows 1118 an access 1120 continue or to occur when a recommendation_score is above 0.75 in a range of [0 . . . 1], attempts to prevent 1104 or terminate 1106 an access when the recommendation_score is below 0.5, and otherwise flags 1110 the access attempt for review. In each case in these examples, however, the risk assessor code 806 or other code 122 takes 1310 cybersecurity action 1100 based on the recommendation score 810. Code may accept 1112 a risk R, or aid mitigation 1102 of the risk R, where R denotes a risk 804 that the scored pair 808 represents an unauthorized attempt 204 by the pair's actor 200 to access 1120 the pair's resource 206.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 12-14 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

One of skill will understand that access attempt information can be scored according to teachings provided herein, in many situations. In particular, the number of user accounts involved, a simplifying assumption that users correspond 1-to-1 with user accounts, the time periods used, the specific functions used by scoring computations, exclusion filters used to focus algorithm input data, and other specifics of the examples discussed above or elsewhere herein are merely illustrative. They do not limit the scope of the teachings presented or the variety of embodiments that are consistent with those teachings.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cybersecurity system, comprising:
   at least one processor;
   a digital memory in operable communication with the processor;
   a machine learning model which has been trained using a collection of training-tuples, each training-tuple including: a training-tuple actor-id identifying a training-tuple actor, a training-tuple resource-id identifying a training-tuple resource in a guarded computing system (GCS), and at least one rating based on how many times the training-tuple actor attempted to access the training-tuple resource; and
   a risk assessor code which upon execution by the processor performs a process that includes (a) feeding a pair to the machine learning model, the pair including a pair actor-id identifying a pair actor and a pair resource-id identifying a pair resource in the GCS, (b) receiving from the machine learning model a recommendation score which is computed at least in part by collaborative filtering based on at least training from a plurality of the training-tuples, and (c) performing at least one cybersecurity action based on the recommendation score, including at least one of: a risk acceptance action which accepts a risk R, and a risk mitigation action which aids mitigation of the risk R, wherein R denotes a risk that the pair represents an unauthorized attempt by the pair actor to access the pair resource, and wherein the recommendation score has an inverse relationship to the risk R.

2. The system of claim 1, wherein the actor-ids each identify at least one of the following: a username, an account, a group of accounts, a role, an agent, a service, a process, a device, one or more IP addresses, or one or more ports.

3. The system of claim 1, wherein the resource-ids each identify at least one of the following: a storage resource, a virtual machine, a database, a database table, an application program interface, one or more IP addresses, a device, an object, an application program, a network interface, a service, a blob, a block, a log, a queue, a container, or a file.

4. The system of claim 1, wherein a plurality of the training-tuple ratings give greater relative weight to lower access attempt counts than to higher access attempt counts.

5. The system of claim 1, further comprising at least one of the following optimization codes:
a ratings calculation code which upon execution calculates training-tuple ratings based on at least one of the following, wherein N represents how many times the training-tuple actor attempted to access the training-tuple resource:
a logarithmic function of N;
a linear scaling function of N;
a summation function of N;
an averaging function of N; or
a normalization function of N;
a tuning code which upon execution adjusts at least one of the following hyperparameters of the machine learning model: a number of latent features, a maximum number of iterations, a fitting accuracy, or a learning rate; or
a clustering code which upon execution clusters actors-ids and resource-ids based at least in part on co-occurrence.

6. The system of claim 1, wherein the machine learning model comprises clustered pairs.

7. The system of claim 1, wherein the machine learning model comprises matrix factorization code.

8. The system of claim 1, further comprising an explanation code which upon execution displays one or more of the following:
a training-tuple actor-id which contributed to the recommendation score;
a training-tuple resource-id which contributed to the recommendation score;
a name or description or both of a latent feature of the trained machine learning model which has a qualitative correlation with the recommendation score;
a recommendation score threshold for performing a risk acceptance action; or
a recommendation score threshold for performing a risk mitigation action.

9. A cybersecurity method, comprising:
forming a pair in response to an actor attempting to access a resource of a guarded computing system (GCS), the pair including: an actor-id identifying the actor, a resource-id identifying the resource;
submitting the pair to a risk assessor code which in turn feeds the pair to a machine learning model which has been trained using a collection of training-tuples, each training-tuple including: a training-tuple actor-id identifying a training-tuple actor, a training-tuple resource-id identifying a training-tuple resource, and at least one rating based on how many times the training-tuple actor attempted to access the training-tuple resource, the machine learning model configured to perform collaborative filtering;
receiving from the machine learning model a recommendation score of the pair computed using collaborative filtering;
implementing an inverse relationship between the recommendation score and a risk score, whereby a high recommendation score corresponds to a low risk score and a low recommendation score corresponds to a high risk score; and
performing at least one of the following cybersecurity actions based at least in part on the risk score or recommendation score or both:
mitigating a risk by preventing or terminating access by the actor to the resource,
mitigating a risk by alerting an administrator,
mitigating a risk by alerting a security tool,
mitigating a risk by flagging the actor or the resource or both as a candidate for further security investigation,
accepting a risk by marking the pair as accepted,
accepting a risk by logging the pair as accepted,
accepting a risk by allowing the actor to access the resource, or
accepting a risk by allowing the actor to continue an access to the resource which has started.

10. The method of claim 9, further comprising training the machine learning model using a training set of training-tuples.

11. The method of claim 9, wherein forming the pair responds to an attempted access by the actor which includes at least one of the following:
reading data from the resource;
requesting data be read from the resource;
writing the resource;
requesting data be written to the resource;
connecting to the resource;
requesting a connection to the resource; or
submitting a command to the resource.

12. The method of claim 9, wherein forming the pair is further characterized in that:
the actor-id identifies at least one of the following: a username, an account, a group of accounts, a role, an agent, a service, a process, a device, one or more IP addresses, or one or more ports; and
the resource-id identifies at least one of the following: a storage resource, a virtual machine, a database, a database table, an application program interface, one or more IP addresses, a device, an object, an application program, a network interface, a service, a blob, a block, a log, a queue, a container, or a file.

13. The method of claim 9, further comprising:
testing the machine learning model using a testing set of testing-tuples which includes multiple tuples that were not used as training-tuples; and
tuning the machine learning model by adjusting at least one of the following hyperparameters: a number of latent features, a maximum number of iterations, a fitting accuracy), or a learning rate.

14. The method of claim 9, further comprising calculating ratings of training-tuples using code which gives greater relative weight to lower access attempt counts than to higher access attempt counts.

15. The method of claim 9, further comprising displaying one or more of the following:
a training-tuple actor-id which contributed to the recommendation score;

a training-tuple resource-id which contributed to the recommendation score;

a name or description or both of a latent feature of the trained machine learning model which has a qualitative correlation with the recommendation score;

a recommendation score threshold for performing a risk acceptance action; or a recommendation score threshold for performing a risk mitigation action.

16. The method of claim 9, further comprising computing the recommendation score, and wherein computing the recommendation score comprises doing a matrix factorization.

17. A storage medium configured with code which upon execution by a processor performs a cybersecurity method, the method comprising:

submitting a pair to a machine learning model which has been trained using a collection of training-tuples, the pair including an actor-id and a resource-id, each training-tuple including: a training-tuple actor-id identifying a training-tuple actor, a training-tuple resource-id identifying a training-tuple resource, and at least one rating based on how many times the training-tuple actor attempted to access the training-tuple resource;

the machine learning model computing a recommendation score of the pair using collaborative filtering, including performing at least one of the following: a singular value decomposition, a principal component analysis, a probabilistic matrix factorization, a non-negative matrix factorization, or another matrix factorization; and selecting at least one cybersecurity action for performance, based at least in part on the recommendation score.

18. The storage medium of claim 17, wherein the machine learning model is configured to operatively communicate with at least one of the following: a cloud service, a cloud infrastructure, a virtual machine.

19. The storage medium of claim 17, further comprising performing at least one selected cybersecurity action involving a user and a storage item, the user being identified by the pair actor-id, the storage item being identified by the pair resource-id, and wherein the selected and performed cybersecurity action includes at least one of the following:

preventing access by the user to the storage item when the computed recommendation score is lower than a specified access-prevention threshold;

terminating access by the user to the storage item when the computed recommendation score is lower than a specified access-termination threshold;

alerting an administrator to the attempted access to the storage item by the user when the computed recommendation score is lower than a specified access-admin-alert threshold;

alerting a security monitoring tool to the attempted access to the storage item by the user when the computed recommendation score is lower than a specified access-tool-alert threshold; or allowing the user to access the storage item when the computed recommendation score is above a specified access-allowable threshold.

20. The storage medium of claim 17, wherein:

the pair actor-id includes at least one of the following identifiers: a source IP address, a source port number, a username, a user agent ID, a user group ID, a user role ID, a user account ID, an agent ID, a service ID, a process ID, or a device ID; and the pair resource-id identifies at least one of the following storage items: a storage resource, a database, a database table, one or more IP addresses, a device, an object, a network interface, a service, a blob, a block, a log, a queue, a container, or a file.

* * * * *